E. L. SCRANTON.
RESILIENT TIRE.
APPLICATION FILED AUG. 10, 1915.
1,194,081.
Patented Aug. 8, 1916.
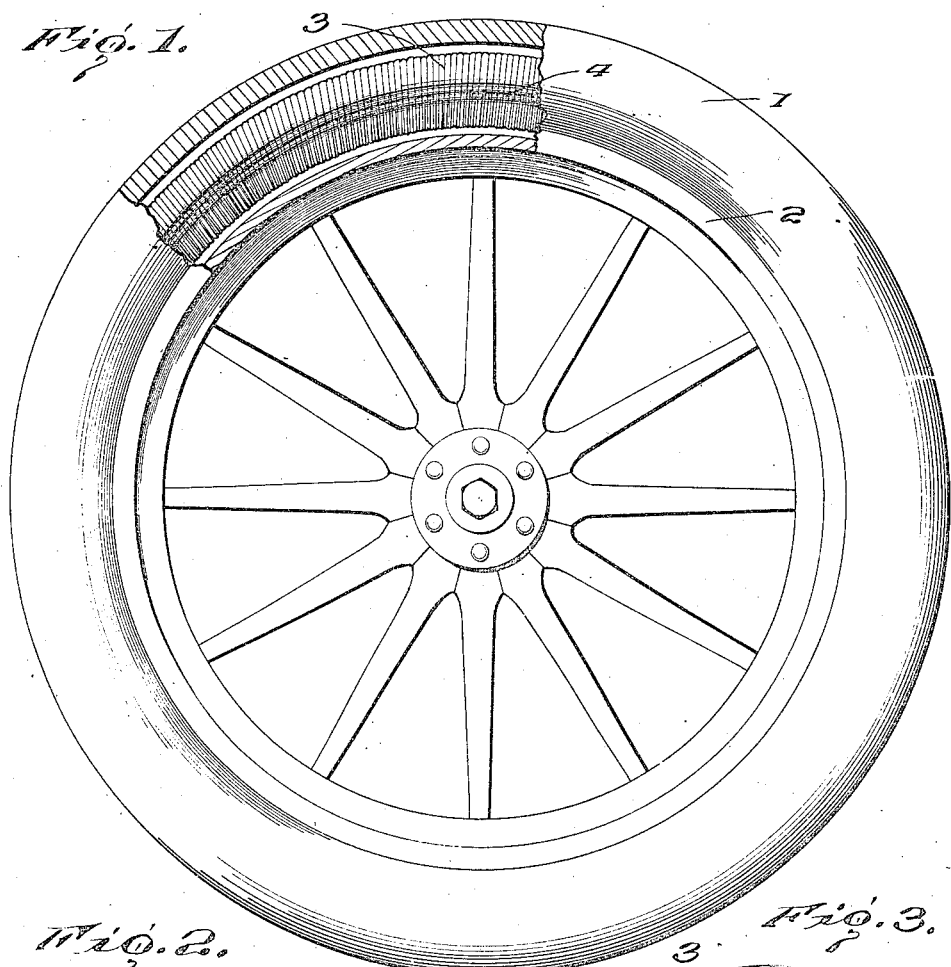
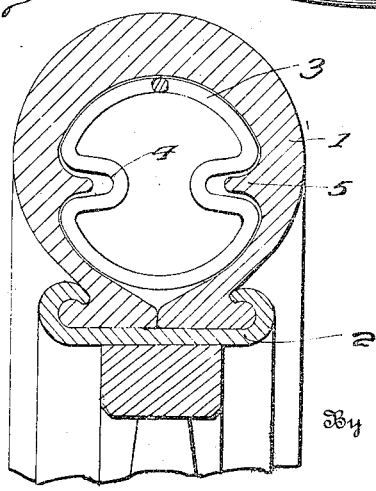
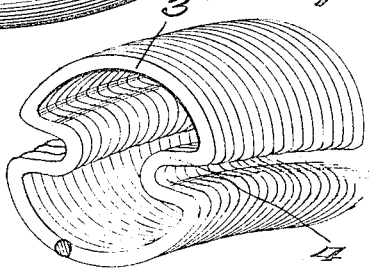
Inventor
E. L. Scranton,
By
Attorneys

UNITED STATES PATENT OFFICE.

ERNEST L. SCRANTON, OF RISING SUN, INDIANA.

RESILIENT TIRE.

1,194,081.  Specification of Letters Patent.  Patented Aug. 8, 1916.

Application filed August 10, 1915. Serial No. 44,804.

*To all whom it may concern:*

Be it known that I, ERNEST L. SCRANTON, a citizen of the United States, residing at Rising Sun, in the county of Ohio and State of Indiana, have invented certain new and useful Improvements in Resilient Tires, of which the following is a specification.

This invention relates to resilient tires for vehicle wheels and has as its object to provide a resilient inner tire which may be disposed within the ordinary tire casing and which will serve effectually as a substitute for the ordinary inflatable inner tube, possessing substantially the same resiliency and yet not possessing the disadvantage of liability to puncture.

The tire embodying the present invention is of that type in which a coiled spring is arranged within the outer tube or casing and by its resiliency serves to cushion the travel of the wheel over the road surface and the invention aims, among other things, to so construct this resilient cushioning member that it will not be liable to become disarranged or distorted and will possess the same degree of resiliency throughout its circumference.

Another aim of the invention is to so construct the resilient cushioning member that while the coils thereof lie close to each other or in actual contact throughout the entire circumference of the member, nevertheless the member will possess the desired resiliency and will yield in the proper manner to absorb shocks and impacts.

In the accompanying drawings: Figure 1 is a side elevation illustrating the tire embodying the present invention, parts being shown in section; Fig. 2 is a vertical transverse sectional view through the tire and casing therefor; Fig. 3 is a perspective view of the resilient cushioning member embodying the present invention.

Corresponding and like parts are referred to in the following description and indicated in all the views of the accompanying drawings by the same reference characters.

In the drawings the numeral 1 indicates a tire casing which may be of any of the well known types constructed to be mounted upon a clencher rim indicated at 2.

The resilient cushioning member embodying the present invention is in the nature of an endless annular coiled spring, the coils being indicated by the numeral 3 and being arranged close to each other or substantially in contact. While the member is illustrated as formed from resilient wire coiled in the manner stated, it will be understood that if desired it may be formed from resilient relatively narrow strip or bar metal similarly coiled. In fact the said resilient cushioning member may be formed in any of a number of ways so long as there is produced a resilient annular body of the form to be now described.

The coils 3 of the resilient cushioning member above referred to are struck in from diametrically opposite sides of the body as indicated at 4 so that the body is provided in each side with an annular flute. By striking in the coils from opposite sides of the body the resiliency of the body is enhanced and the body is adapted to more effectually absorb shocks and impacts than would be the case if the coils described true circles. In arranging the body within an outer tube it is inserted within the tube in the position shown clearly in Fig. 2 of the drawings and with the flutes in its sides presented in lateral directions. The body is adapted to be inserted within an outer tube or casing of any of the ordinary and well known types and will not be liable to become displaced or disarranged under running conditions. However, if it is desired to positively insure against overturning of the body within the casing and to provide against the struck in portions 5 in the coils becoming relatively displaced and interlocked in displaced position, the wall of the casing may be formed interiorly at opposite sides with inwardly projecting annular beads 5 engaging in but not filling the flutes in the sides of the body 3.

Having thus described the invention, what is claimed as new is:

1. The combination with a tire casing provided interiorly upon its walls with integral inwardly projecting annular beads, the beads being located diametrically opposite each other with relation to the center of the casing, of a resilient cushioning member comprising a hollow annular body substantially circular in cross section, the body being disposed within the casing and being provided in its sides with annular flutes to receive the said beads.

2. The combination with a tire casing provided interiorly upon its walls with integral inwardly projecting annular beads, the beads being located diametrically opposite each other with relation to the center of the casing, of a resilient cushioning member comprising a hollow annular body substantially circular in cross section, the body being disposed within the casing and being provided in its sides with annular flutes to receive the said beads, the beads being of a thickness and width less than the width and depth of the respective flutes.

In testimony whereof I affix my signature in presence of two witnesses.

ERNEST L. SCRANTON. [L. S.]